UNITED STATES PATENT OFFICE.

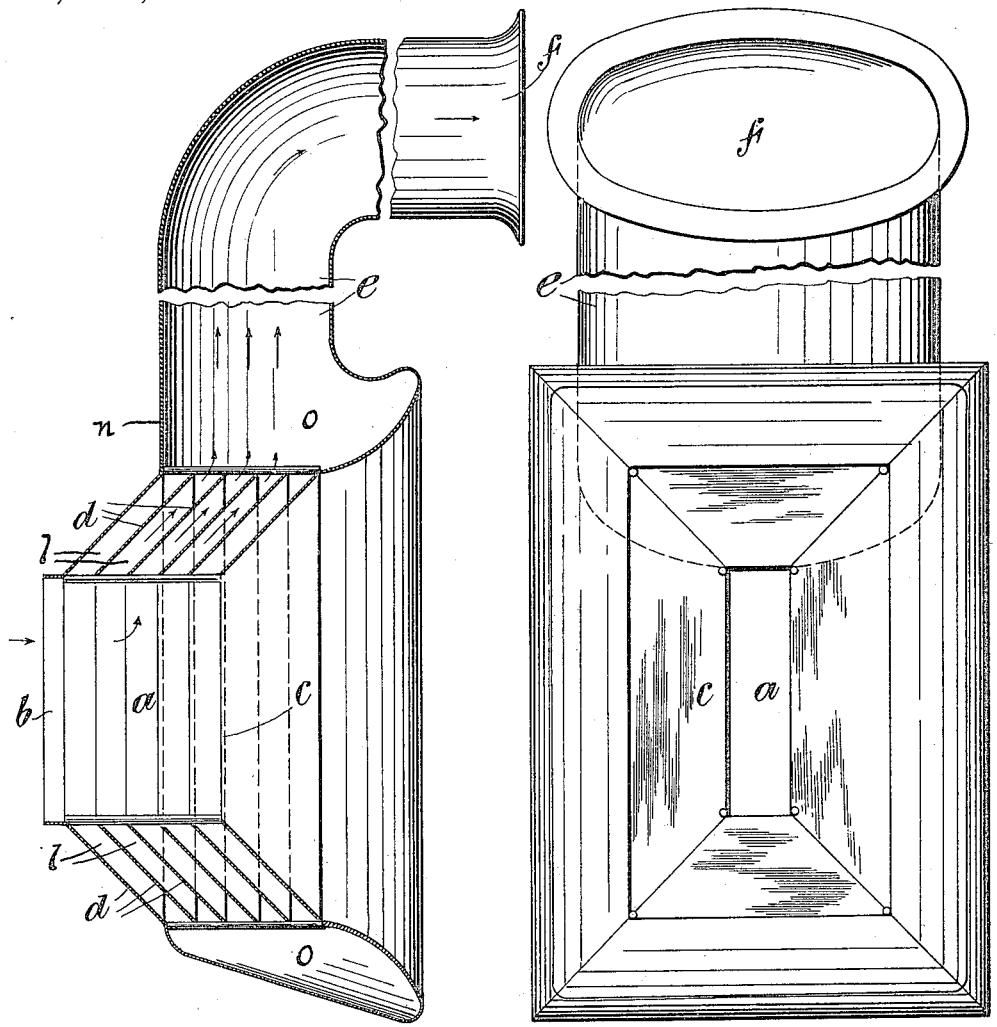
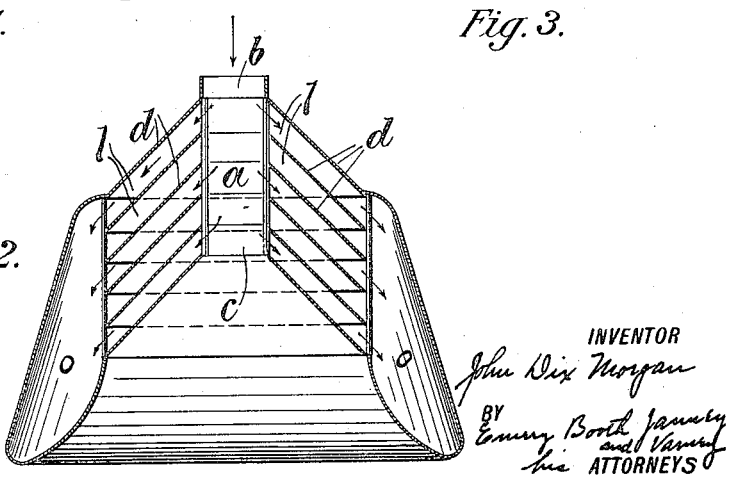

JOHN DIX MORGAN, OF NEW YORK, N. Y.

VISION-GUARD.

1,151,603.

Specification of Letters Patent.   Patented Aug. 31, 1915.

Application filed August 1, 1912.   Serial No. 712,625.

*To all whom it may concern:*

Be it known that I, JOHN DIX MORGAN, a citizen of the United States, and a resident of the borough of Manhattan, city of New York, have invented an Improvement in Vision-Guards, of which the following description, in connection with the accompanying drawings, is a specification, like letters on the drawings representing like parts.

The object of the present invention is to provide a vision guard that is a means whereby locomotive engineers or other drivers of vehicles may have an unobstructed view of the road ahead.

At present the front of a locomotive cab is usually provided with windows of glass or other transparent material, it being necessary to have some substance interposed to protect the eyes of the driver from dust, cinders, etc. The objection to this is the fact that such transparent material becomes clouded with smoke and dust or may be covered with snow thus greatly obstructing the driver's view.

My invention, which is designed to render such obstruction impossible and at the same time to protect the eyes of the driver, consists in providing a straight passage located in the forward wall of the cab where the window is ordinarily found, and having at its front and rear, openings of a size and shape suited to the particular uses of the vehicle. This passage is surrounded by a series of deflecting surfaces so arranged and related that air which enters the forward opening of the passage will be prevented from escaping through the rear opening into the cab, so that the driver of a vehicle so equipped may look directly ahead without danger and with his view quite unobstructed.

In the drawings forming a part of this specification, Figure 1 is a central vertical section of one embodiment of the device with a part of the housing broken away to show the arrangement of deflectors. Fig. 2 is a horizontal section, and, Fig. 3 is a rear view.

Referring now to Fig. 1, $a$ is a straight passage having front and rear openings $b$ and $c$ respectively. A series of deflecting members $d$ frames the passage from the forward opening to the rear opening, these members being arranged to form passages $l$ leading to the surface of the device proper. A housing as $n$ may be provided but is not essential to successful operation. As here shown, the housing forms a chamber $o$ and a conduit $e$ leading therefrom has a discharge end $f$ opening away from the direction of motion of the vehicle.

In operation, where no housing is used, the air rushing past the exterior opening of the passages $l$ tends to create a reduction of pressure therein. As air enters the opening $b$, it is therefore drawn past the deflectors $d$ into the passages $l$ instead of passing through the rear opening $c$. With this air, will also pass such dust, cinders, etc. as may be carried by it. Where the housing is used, the conduit $e$ and the opening $f$ may be considered as continuing the function of the passages $l$.

The precise number and spacing of the deflecting surfaces $d$ is, so far as I have been able to ascertain, immaterial to the successful practice of the invention. However, I have discovered that the passage $a$ should be sufficiently long from front to rear in proportion to its cross section to produce the deflection of the air entering the passage $a$, as contemplated. This may be easily determined in practice, for any given case.

I claim as my invention:

1. A vision guard comprising a plurality of spaced deflecting surfaces arranged to frame a central passage and to form diverging passages in communication therewith, the inlet openings of said diverging passages being so proportioned with respect to the opening of the central passage as to divert an incoming current of air from said central passage.

2. A vision guard comprising a plurality of spaced deflecting surfaces arranged to frame a central passage and to form diverging passages in communication therewith, the area of the outlet openings of said diverging passages being greater than the area of the inlet openings.

3. A vision guard comprising in combination a plurality of spaced deflecting surfaces arranged to frame a central passage and to form diverging passages in communication therewith, and a conduit communicating with the outlet ends of said diverging passages.

In testimony whereof, I have signed my name to this specification, in the presence of two subscribing witnesses.

JOHN DIX MORGAN.

Witnesses:
JOHN W. THOMPSON,
ALEXANDER S. GROSS.

Copies of this patent may be obtained for five cents each, by addressing the "Commissioner of Patents, Washington, D. C."